United States Patent [19]

Moyet-Ortiz

[11] Patent Number: 4,944,321

[45] Date of Patent: Jul. 31, 1990

[54] PORTABLE VEHICLE GARAGE AND TENT STRUCTURE

[76] Inventor: Francisco Moyet-Ortiz, Valle Tolimas, Calle 11 N-17, Caguas, P.R. 00625

[21] Appl. No.: 473,732

[22] Filed: Feb. 2, 1990

[51] Int. Cl.$^5$ .............................................. E04H 15/06
[52] U.S. Cl. ........................................ 135/88; 135/95; 135/103; 135/112; 296/136
[58] Field of Search ................... 135/88, 95, 96, 111, 135/103, 109, 112, 101, 114; 296/136

[56] References Cited

U.S. PATENT DOCUMENTS

| | | | |
|---|---|---|---|
| 1,819,490 | 8/1931 | Weiss | 135/112 X |
| 2,571,362 | 10/1951 | Hervey | 296/136 |
| 2,598,940 | 6/1952 | Robie | 135/DIG. 1 X |
| 2,608,198 | 8/1952 | Goodman | 135/104 |
| 2,798,501 | 7/1957 | Oliver | 135/88 X |
| 2,989,967 | 6/1961 | Lee | 135/88 |
| 3,463,174 | 8/1969 | Heller | 135/88 X |
| 4,605,030 | 8/1986 | Johnson | 296/136 X |
| 4,655,236 | 4/1987 | Doramé et al. | 135/88 |

FOREIGN PATENT DOCUMENTS

| | | | |
|---|---|---|---|
| 1036079 | 8/1958 | Fed. Rep. of Germany | 135/112 |
| 1427004 | 12/1965 | France | 135/88 |
| 2380155 | 10/1978 | France | 296/136 |
| 0718958 | 11/1966 | Italy | 135/103 |
| 0384150 | 1/1965 | Switzerland | 135/111 |
| 875992 | 8/1961 | United Kingdom | 135/88 |

*Primary Examiner*—Carl D. Friedman
*Assistant Examiner*—Lan Mai
*Attorney, Agent, or Firm*—William Nitkin

[57] ABSTRACT

A combination portable vehicle garage and tent structure incorporating support members which in the garage mode are retained under the wheels of the vehicle which support members have a framework of support poles and cross members with a cover to shelter the vehicle which structure, when a vehicle is not positioned therein, can be utilized as a tent.

14 Claims, 2 Drawing Sheets

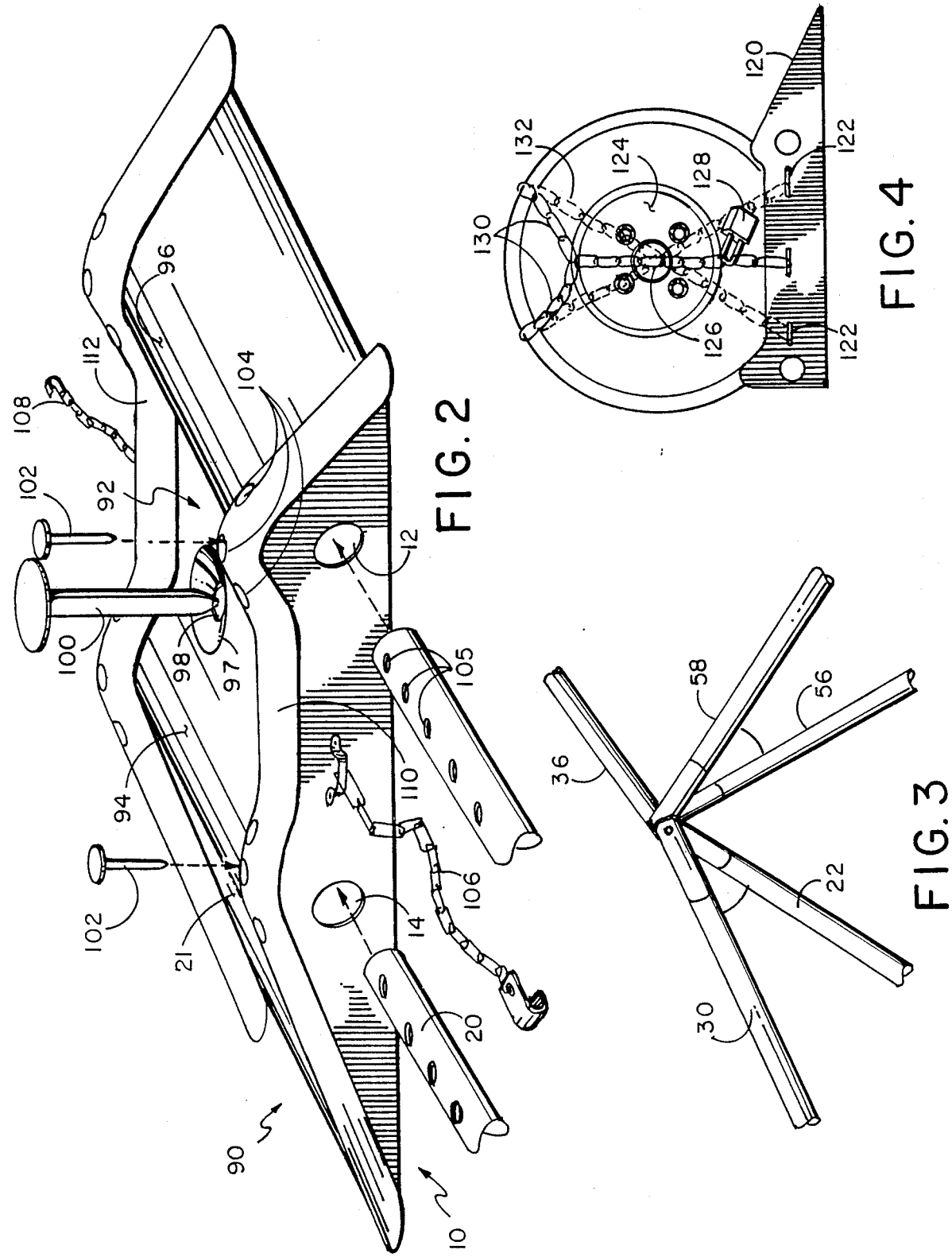

PORTABLE VEHICLE GARAGE AND TENT STRUCTURE

BACKGROUND OF THE INVENTION

1. Field of the Invention

The structure of this invention resides in the area of portable vehicle shelters and more particularly relates to an erectile structure having platform members on which a vehicle can be driven with attached framework and covering to protect the vehicle and, in an alternate embodiment, such structure can be fixed to the ground without a vehicle contained within for use as a tent.

2. Description of the Prior Art

Vehicle covers are well known in the prior art and usually consist of a fabric or plastic cover which is stretched over the vehicle and affixed to the lower portions of the vehicle. Some of such covers do not include any support framework, and problems have been noted in the prior art concerning abrasion of the vehicle's finish due to the action of wind moving the cover back and forth repeatedly. Further, such fabric or plastic covers cannot be used independently of the vehicle contained under it. Other vehicle covers have been developed which do include a framework such as the Collapsible Cover for Vehicles by F. D. Robie, U.S. Pat. No. 2,598,940 which discloses a framework structure which extends over a vehicle. Another framework structure which also can be utilized as a tent is the Combination Vehicle Cover and Tent by Goodman, U.S. Pat. No. 2,608,198. This patent provides a door that corresponds with the door opening of the vehicle and has flexible transparent portions permitting vision through the cover to admit light into the vehicle. This structure is noteworthy in relation to the present invention because it suggest that the structure can be converted into a tent apart from its use as a vehicle cover. The structure has a complex framework of inter-engaging elements and telescoping poles. The prior art also includes many structures which are collapsible in nature and which have elements which extend under the wheels of the vehicle to hold the structure in position. One such device, Collapsible Housing Structure to J. F. Oliver disclosed in U.S. Pat. No. 2,798,508 illustrates an anchoring pad which is positioned under the front wheels of the vehicle and which retains the framework securely to the ground, the framework extending with several hoop members to support a covering over the car. Similarly, a patent for Portable Cover Structure to Heller, U.S. Pat. No. 3,463,174 discloses a structure which also has stabilizing plates which can be fitted under the front wheels of the vehicle to hold an extensive structural framework from which a covering is suspended like a curtain with a roof covering. More recent patents include Portable Carport to Dorame et al, U.S. Pat. No. 4,655,236 which discloses a portable carport with elements which fit under both the front and rear wheels of the vehicle with pole elements that support a cover over the vehicle. Similarly, in the Johnson patent for Portable Erectile Vehicle Shelter Structure, U.S. Pat. No. 4,605,030 a shelter which is primarily a sunshade is shown supported by a framework extending from pads on which the tires rest.

SUMMARY OF THE INVENTION

It is an object of this invention to provide a combination vehicle garage and shelter which, when desired, can be utilized as a tent separate and apart from its use as a vehicle covering and which can be easily erected and dismantled and conveniently carried.

It is a further object of this invention to provide a structure having framework adjustment means so that the structure can be used to cover vehicles of different shapes and sizes.

The device of this invention includes four support members which are positioned, in one embodiment, under each wheel of the vehicle respectively. To these support members are attached and adjustably positioned a series of support poles as described further below which support cross members and a cover. The cover can be made of fabric or plastic or equivalent light-weight material as required by the user for his specific needs. The choice of the appropriate material for the cover would depend upon where the invention would be utilized as well as the size and shape of the vehicle to be covered. In some environments a plastic or nylon-coated cover would be desirable to retain heat within the structure such as in cold climates where the heat from the engine might remain within the structure for a period of time thereby assisting in starting the vehicle's motor at a later time. In tropical environments air-circulating fabrics can be used to prevent moisture buildup within the cover's structure. In other situations a combination of fabric and plastic can be used, for example, when camping it would be desirable to have a fabric covering to allow air to flow into the tent and also some plastic might be desirable to collect water when camping by having rainfall channeled and collected for drinking water purposes.

The structure also can be provided with an opening aligned with a door of the vehicle and further can heve aperture(s) aligned with the vehicle's exhaust pipes so that the exhaust can be vented outside the structure to prevent carbon monoxide posioning. External heaters could also be provided to pump hot air into such apertures to heat the interior or the structure if desired. Filters can be used to help clean the air to remove any polluted air from inside the structure of this invention.

The support members and poles can be made of a lightweight material such as aluminum or steel or even plastic tubing or equivalent materials which are strong enough to support the cover that is desired to be utilized. The support members, being generally pyramidal with a palmiped bottom to help support them on the ground and prevent them from sinking into the ground, have ramps designed so that the vehicle can be easily driven thereupon to hold such support members securely in place. When the vehicle is in place on the support members, the tires rest in concave areas. When the structure is desired to be utilized as a tent without the vehicle in place on top of the support members, a central aperture in each of the support members is provided through which a spike can be driven to retain such support members in position on the ground so that the structure can be "free-standing" and will not move during windy periods. The area around the spike can be further concave so that if a vehicle is positioned on the support members, the spikes will not contact the tires as the spike's head will be within the concave area. The support members are designed to be stacked for easy storage, and the support members further include a system for attachment to the tires of the vehicle for secure retention thereto. Chain members can be locked to the wheels which locking will prevent theft of the vehicle as the wheels could not fully rotate with the support members attached as the support members would strike the vehicle's body. If, though, the vehicle should become stuck, for example, in mud or snow, operation of the vehicle with the support members locked to the wheels during a partial rotation of the wheels could help free the vehicle. In one embodiment the framework at the front of the tent structure can be removable so that the structure can be set up, the cover pulled back and the vehicle driven in and out allowing the structure to be used as a temporary garage from which the vehicle can enter and exit as desired. In some embodiments the cover can be printed in a camouflage design for military usage.

BRIEF DESCRIPTION OF THE DRAWINGS

FIG. 2 illustrates a view of a support member of this invention with pole members pulled away therefrom and spike member shown above the central receipt aperture.

FIG. 3 illustrates central cross member being held in place by the interconnection of the front central support pole and rear central support pole at the top central portion of the vehicle.

FIG. 4 illustrates a side elevational view of a support member chained and locked to a tire.

DESCRIPTION OF THE PREFERRED EMBODIMENT(S)

Figure 1:
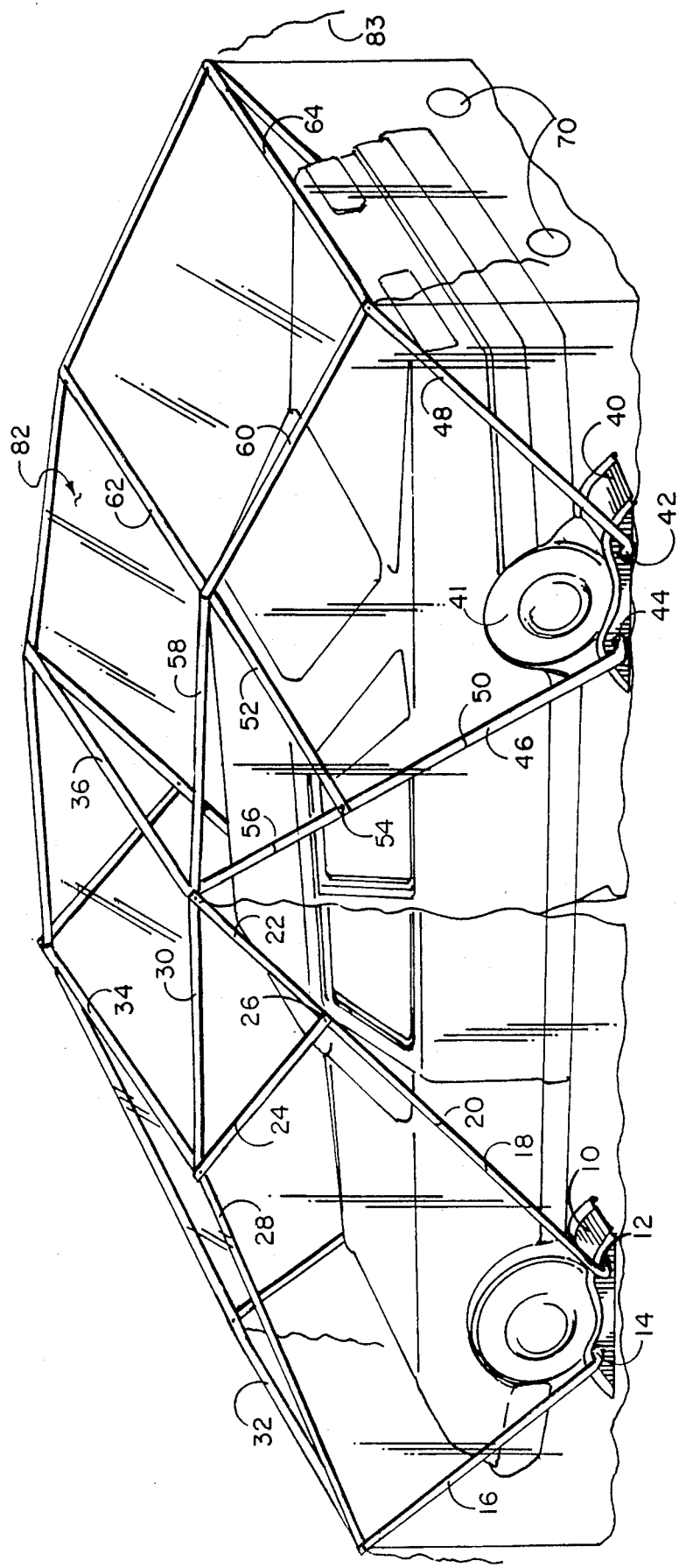
FIG. 1 illustrates a perspective view of the vehicle garage and tent structure of this invention with an automobile in place therein.

FIG. 1 illustrates a perspective view of the device structure this invention with support member 10 shown under the left front wheel of the vehicle and similar support members, such as support member 40, under each of the other wheels. The structure affixed to support member 10 is similar to that of the other three support members and the interconnections of these structures will be explained below. At the front portion of support member 10 is first pole receipt aperture 14 and at the rear portion is second pole receipt aperture 12. These are also seen in FIG. 2 in enlaged view. FIG. 2 illustrates sloped ramp 90 having tread 21. Tread 21 helps provide traction for the tires when the vehicle is driven up the ramps. Trough 92 is formed in the central portion of support member 10 and is positioned lower than first ridge 94 and second ridge 96. When the tire passes over first ridge 94, ridges 94 and 96 help retain the tire in trough 92 after such tire passes downward into trough 92. Further forward movement of the tire is made difficult as the tire would have to rise up over second ridge 96, and rearward movement when the car is not operating is prevented by first ridge 94 then disposed at the rear of the tire. First side ridge 110 and second side ridge 112 provide ridges which are positioned laterally at each side of support member 10 extending above the edges of trough 92 and ramp 90 which ridges prevent any lateral movement of the tire either off the sloped ramp 90 or off trough 92. Seen in a central portion of trough 92 is central aperture 98. Around central aperture 98 is recess 97 adapted to receive the head of spike 100 so that the head is flush with the bottom of trough 92 and would not protrude into the vehicle's tire if a vehicle were driven on the support member with spike 100 in place. In FIG. 2 a spike 100 is also seen disposed above central aperture 98. When the device is to be utilized as a tent and there is no vehicle in place holding support member 10 to the ground, spike 100 can be driven into the ground through central aperture 98, and the structure can be utilized as a tent. As seen from the side, second pole receipt aperture 14 extends under ridge 94 and is adapted to receive the angularly disposed portion of front support pole 16. Front support pole 16 first extends out of second recipt aperture 14 and then extends upward at a right angle. The portion of the pole that protudes through second pole receipt aperture 14 can be aligned and positioned at a desired angle to support member 10 as there are a series of adjustment angle apertures 104 above each receipt aperture in support member 10 and a series of alignable pole adjustment apertures 105 are formed in each pole. Depending upon the alignment of front support pole 16 in second receipt pole aperture 14, a pin 102 can be positioned through one of the adjustment angle apertures 104 and held in place by the support member, and such pin can then pass into pole adjustment aperture 105. The upwardly extending portion of the pole will then be positioned at right angles to the attached portion within the support member into which pin 102 has been inserted so that the angle of position of each pole in each receipt aperture is adjustable in positioning the upwardly extending portion of each such pole as, for example, front support pole 16. In the same fashion a front central support pole 18 can be inserted into first pole receipt aperture 12 as seen in FIGS. 1 and 2 with a similar pin adjustment made with pin insertion into the selected adjustment angle aperture in the support member with such pin then passed into the pole aperture. Front central support pole 18 is an extendable pole which has a front central pole first adjustment member 20 which pole can be adjusted in length by telescopic-type mechanisms well known in the art. Central support pole 18 extends upward to where it interconnects with central cross member 36 above the center of the vehicle as will be described further below. From front central support pole 18 extends front middle support pole 24 which is attached thereto by means of angle adjustment 26 whereby its angle to front central support pole can be adjusted which angle adjustment means are well known in the art. Middle support pole 24 extends to upper front support pole 28 which extends downward therefrom and interconnects with front support pole 16. Further, top front support pole 30 extends from the end of front middle support pole 24 to the top of the front central support pole 18 where it interconnects with central cross member 36. These interconnections are seen enlarged in FIG. 3. A front middle cross member 34 extends from the junction of front middle support pole 24 and upper front support pole 28, and front cross member 32 extends from the junction of upper front support pole 28 and front support pole 16. These cross member poles extend over and attach to a similar support pole structure on the opposite side of the vehicle. In the same way a duplicate support pole structure in reverse extends from ramp 40 under rear wheel 41 with a rear support pole 48 extending from first pole receipt aperture 42 in support member 40 and rear central support pole 46 extending from second receipt pole aperture 44. Rear central support pole 46 is adjustable lengthwise with rear central pole first adjuster 50 thereon. Rear central support pole 46 extends upward to rear middle support pole 52 which extends therefrom at an adjustable angle. Rear central support pole 46 then extends further up to its junction with central cross member 36. A first and second telescoping length adjuster 22 and 56 respectively can be disposed both on front central support pole 18 and rear central support pole 46 respectively which can further adjust the height of front and rear central support poles 18 and 46 respectively to accommodate whatever vehicle is placed within the structure of this invention. Front middle support pole 24 and rear middle support pole 52 also can be adjusted angularly at angle adjustments 26 and 54 respectively so that front middle cross member 34 and rear middle cross member 62 can be also angularly positioned depending upon the shape of the vehicle so as to accommodate vehicles of various shapes within the structure. Top rear support pole 58 extends from its junction with central cross member 36, as can be seen in FIG. 3, to the end of rear middle support pole 52 at which point there is a rear middle cross member 62 extending across to a similar support structure on the other side of the structure. Upper rear support pole 60 then extends from the end of rear middle support pole 52 to the top of rear support pole 48 at which point rear cross member 64 also extends across to a similar structure on the opposite side of the vehicle which, as stated before, is a duplication of the structure on the side of the device that has just been described except that the insertion points of the ends of the support poles extend inwardly to the pole receipt apertures opposite the right angle extensions of those that are seen in FIG. 1. Aperture(s) 70 can be provided in covering 82 to allow vehicular exhaust to escape, and a tubular member can be attached from the vehicle's exhaust pipe through an aperture if desired. Further, slit 80 in covering 82 can be provided which can act as a doorway to allow entrance to, and exit from the inside of the structure.

The adjustable members of the support pole system and cross member system of this invention allow the cross members to be assembled and adjusted in a variety of positions to accommodate many different vehicle shapes. As mentioned above, the support members and ramps are designed so that they can be stacked for storage when the support members and poles are dismantled.

The support members can include tire attachment straps or chains 106 and 108 which can be affixed to the rims of the wheels of the vehicle to securely attach the support member to the vehicle for further security. FIG. 4 illustrates a side elevational view of a support ramp 120 with a tire 124 positioned thereon. While the support ramp of FIG. 2 includes the attachment members which can be affixed to the wheel rim, in some instances as discussed above, it may be desirable to securely lock the support members to the wheels and tires. If the tires have apertures formed in the wheels, chain 106 and 108 can be passed through the apertures and padlocked together on one side of the wheel which locking will prevent the removal of the wheel from the ramp. In situations where there are no apertures in the wheels, then chain interconnection attachments 122 can be provided on support member 120 for attachment of a chain member 126 which can, in one embodiment, extend upward to where it bifurcates forming two chain members 130 which extend upwards and then over the rear of the tire and can if desired cross in the rear of the tire around the axle as seen by chains 132 shown in dotted outline then attaching to the attachment points 122 disposed on the other side of support member 120. A padlock 128 can be used to securely hold the chain members together. Other methods of chain tiedowns to the support members with locking means could also be utilized to accomplish the objectives of this invention.

The support members of this invention are easily utilized because they are merely placed one in front of each wheel and then the vehicle is driven up the sloped ramp to rest within the trough therein. The use of telescoping poles also allows such poles to be moved, one within the other, for more compact storage.

It also should be noted that in some embodiments certain cross members are removable, especially the front or rear cross members, so that covering 82 can be pulled back and the vehicle driven out of the structure with the balance of the framework still left intact. Cover 82 can have a series of ties 83 for affixation to the vehicle at various positions to help hold the cover in place especially during rain, snow or high winds and to prevent accumulations of leaves, snow or other materials from forcing the cover downward between the cross members or support members. Apertures 70 can be utilized not only to release vehicular exhaust from the structure but also to introduce heat from a heater into the assembled structure so that either the tent or the vehicle contained therein can be heated as would be desirable in very cold environments.

Although the present invention has been described with reference to particular embodiments, it will be apparent to those skilled in the art that variations and modifications can be substituted therefor without departing from the principles and spirit of the invention.

I claim:

1. A structure useful as a cover in a first mode for a four-wheeled vehicle having a front and rear and as a tent in a second mode, comprising:

first, second, third and fourth support members, each having a front and rear, each positioned respectively under a wheel of said vehicle retaining such support members to the ground with said first and second support member disposed under the front wheels of said vehicle and said third and fourth support members disposed under the rear wheels of said vehicle;

a first pole support receipt means positioned in the front of each of said support members;

a second pole support receipt means positioned in the rear of each of said support members;

first and second front support poles having a top and bottom with the bottom of each affixed respectively to the first pole support receipt means of said first and second support members disposed under the front wheels of said vehicle, said first and second front support poles extending upward and forward with respect to said vehicle;

first and second front central poles having a top and bottom with the bottom of each affixed respectively to the second pole receipt means on said first and second support members disposed under the front wheels of said vehicle, said first and second front central poles extending upward and rearward with respect to said vehicle;

first and second rear support poles having a top and bottom with the bottom of each affixed to said second pole receipt means respectively of said third and fourth support members under the rear wheels of said vehicle, said first and second rear support pole extending upward and rearward with respect to said vehicle;

first and second rear central poles, each having a top and bottom with the bottom of each affixed to said first pole receipt means, respectively, of said third and fourth support members, said first and second rear central pole extending upward and forward with respect to said vehicle and attached at their tops to the tops of said first and second front central pole, respectively, on each side of said vehicle;

a central cross member interconnecting the tops of said attached first and second front central poles and said first and second rear central poles;

first and second middle support poles, each having a top and bottom with their bottoms angularly adjustably attached respectively to said first and second front central pole, said front middle support poles extending forward and upward with respect to said vehicle;

first and second upper front support poles extending from the tops of said first and second front support poles to the tops of said first and second front middle support poles, respectively;

first and second top front support poles extending from the tops of said first and second middle support poles, respectively, to the junction of said first and second front central poles and said first and second rear central poles at said central cross member;

first and second rear middle support poles, each having a top and bottom with their bottoms angularly adjustably attached respectively to said first and second rear central poles, said first and second rear middle support poles extending rearward and upward with respect to said vehicle;

first and second upper rear support poles extending respectively from the tops of said first and second rear support poles to the tops of said first and second rear middle support poles;

first and second top rear support poles extending from the tops of said first and second front middle support poles to the junction of the tops of said first and second front and rear central poles;

a front middle cross member extending from the top of said first front middle support pole over to said second front middle support pole;

a rear middle cross member extending from the top of said first rear middle support pole to said second rear middle support pole;

a front cross member extending from the top of said first front support pole to said second front support pole;

a rear cross member extending from said first rear support pole to said second rear support pole; and covering extending over the structure of support poles and cross member to cover said structure.

2. The structure of claim 1 wherein said first and second front and rear central support poles have adjustment means for extending or shortening their length as desired to accommodate the size of the vehicle within said structure.

3. The structure of claim 2 further including a slit defined in said covering to allow access into said structure.

4. The structure of claim 3 further including apertures defined in said covering forming vents for release of vehicular exhaust gases outside said structure or for the input of heat within said structure or to attach a filter to filter in clean air.

5. The structure of claim 1 wherein each of said support members includes an aperture defined in the center thereof for use when said structure is in its tent mode, said structure further including four spike members, each adapted to be driven through the center aperture in each of said support members to retain said support members to the ground.

6. The structure of claim 5 wherein each of said support members includes a ramp member adapted for driving said vehicle upwards onto said support member.

7. The structure of claim 6 wherein each of said support members includes a trough disposed in a central portion thereof, said support members further having first and second ridges disposed, respectively, in front of and behind said trough to contain said wheel within said trough.

8. The structure of claim 7 wherein each of said support members includes attachment means to affix one of said support members to one wheel of said vehicle.

9. The structure of claim 8 wherein said attachment means include locking means to lock said support member to the wheel of said vehicle.

10. The structure of claim 9 wherein each support member includes wheel attachment means and locking means.

11. The structure of claim 6 wherein each of said support member's pole support means includes first and second pole receipt apertures defined within each of said support members under said first and second ridges thereof, said pole retention apertures extending the width of said support member; said support poles having their bottoms extending at right angles thereto; each pole retention aperture adapted to receive and retain such extending portion of said support pole, each of said support members further having a plurality of angle adjustment apertures defined therein above each pole retention aperture; four pins, each for insertion in a selected one of said plurality of angle adjustment apertures; and a plurality of pole adjustment apertures defined in each inwardly extending portion of each of said support poles for receiving one of said pins when passed through a selected angle adjustment aperture above the pole retention aperture to determine the angular position of said pole within the pole retention aperture and to retain the pole within said pole retention aperture.

12. The structure of claim 11 further including a plurality of tiedown means for securing said covering to portions of said vehicle.

13. The structure of claim 11 wherein each of said support members has third and fourth ridge members extending along the sides of its trough and the sides of said ramp for retention of said wheels as said vehicle is driven up said ramp and over said first ridge into said trough.

14. The structure of claim 13 further including second length adjustment means on said first and second front central poles and on said first and second rear central poles.

* * * * *